No. 647,523. Patented Apr. 17, 1900.
W. B. ROBERTS.
VEHICLE WHEEL.
(Application filed May 28, 1898.)
(No Model.)
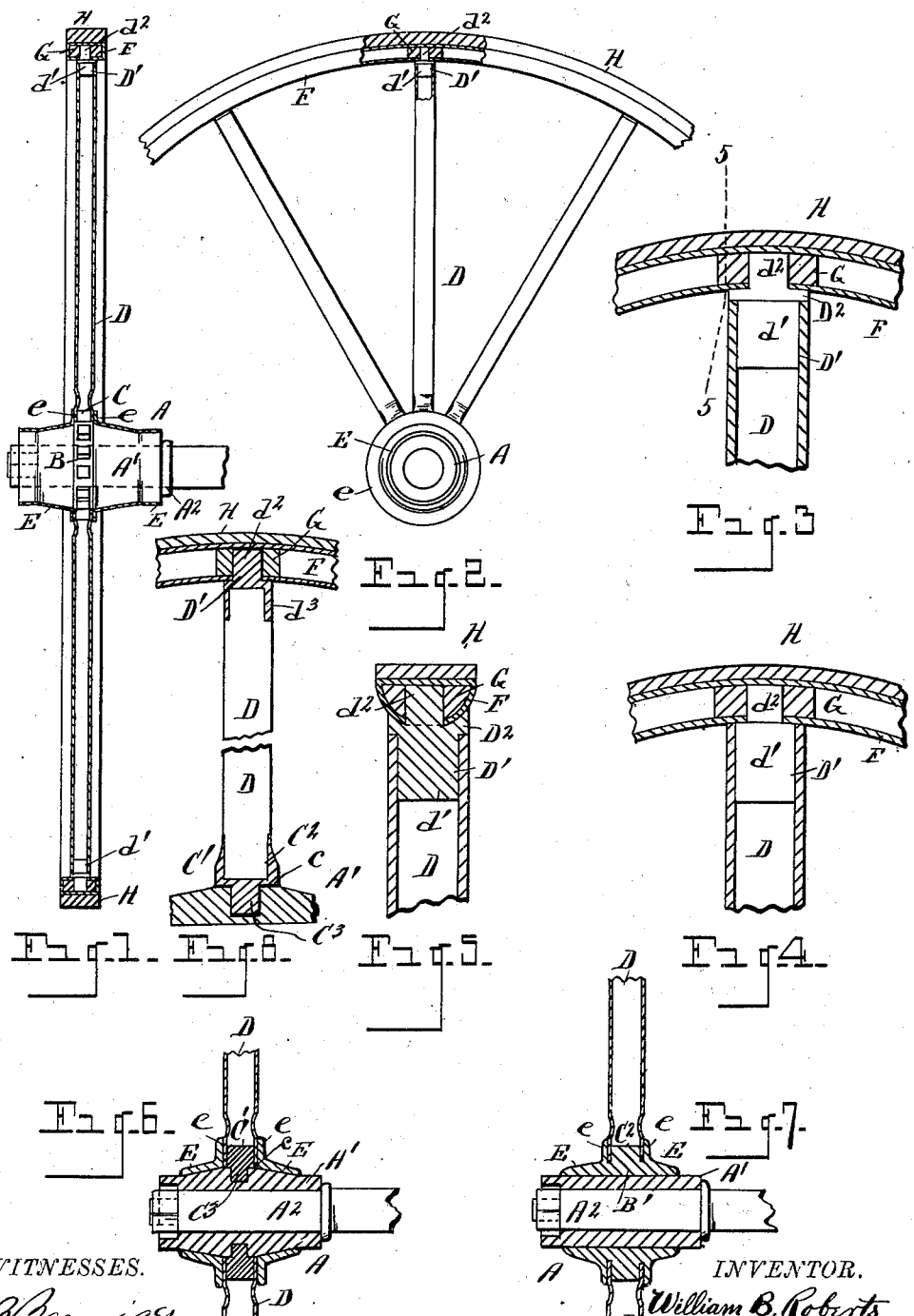
WITNESSES.
INVENTOR.
William B. Roberts
By Newell S. Wright
His Attorney

UNITED STATES PATENT OFFICE.

WILLIAM B. ROBERTS, OF CHICAGO, ILLINOIS.

VEHICLE-WHEEL.

SPECIFICATION forming part of Letters Patent No. 647,523, dated April 17, 1900.

Application filed May 28, 1898. Serial No. 681,981. (No model.)

*To all whom it may concern:*

Be it known that I, WILLIAM B. ROBERTS, a citizen of the United States, residing at Chicago, county of Cook, State of Illinois, have invented a certain new and useful Improvement in Vehicle-Wheels; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in a vehicle-wheel; and it consists of the construction, combination, and arrangement of devices hereinafter specified and claimed, and illustrated in the accompanying drawings, in which—

Figure 1 is a view in vertical section showing parts in elevation. Fig. 2 is a view of a portion of a wheel in elevation, showing a part in section. Fig. 3 is a detail view showing the felly and spoke in section and parts in elevation. Fig. 4 is a similar view to Fig. 3, showing a modification. Fig. 5 is a view in cross-section on the line 5 5, Fig. 3. Fig. 6 is a view in section illustrating a modification of the invention. Fig. 7 is a similar view illustrating another modification of the invention. Fig. 8 is a detail view of still another modification.

I carry out my invention as follows:

In the drawings, A represents a vehicle-hub which may be made of any desired material. I prefer that said hub should be made of a wood body A' and with the usual metal box or skein $A^2$; but I do not limit myself solely thereto. This hub may be provided with a metal band B, encircling the body of the hub at the longitudinal center thereof, said band provided with outwardly-projecting lugs or dummy spokes, (indicated at C.)

D represents the spokes. In Fig. 8 the spoke is shown made solid, as of wood, while in the remaining figures the hubs are shown made of hollow metal. The purpose of the band B with its lugs C is to receive the adjacent ends of the spokes when made of hollow metal, said spokes being sleeved tightly over and upon said lugs, the lugs firmly entering the inner ends of the hollow spokes and holding said spokes in proper position upon the hub.

E denotes a metal band passed around the hub and fitting up snug and tight against the lower ends of the spokes D and firmly holding the said spokes in place.

F indicates the felly, preferably made hollow or chambered and to which the spokes are engaged. This felly may be made in any suitable manner—as, for example, like the felly embodied in a patent of the United States granted to me January 7, 1896, No. 552,719. The spokes are preferably provided toward their outer extremities with a malleable or other metal end piece D', having a portion or stem $d'$ at its lower end when used in connection with a hollow spoke to snugly enter the outer end of the hollow metal spoke and with an additional stem $d^2$ to enter a block G, of wood or other suitable material, in the felly, the said stem $d^2$ being secured in place in said block, the block serving the further purpose of cushioning or deadening a possible metallic sound of the wheel. The end piece D' may also be constructed with a flanged head $D^2$, intervening between the spoke and the felly, if desired. In Fig. 4 I show the construction of the metal end piece D' without the flanged head $D^2$, the end of the spoke setting up snugly against the felly.

H indicates the tire of the wheel, which may be secured in place in any desired way—as that, for example, described in my said patent above referred to. While I have shown and described the spokes provided with the end pieces D', I do not limit myself solely thereto.

Where a wooden spoke is employed, as shown in Fig. 8, the end piece D' may be constructed with a socket $d^3$ to engage the adjacent end of the spoke. The end piece D' is preferably made of malleable metal shaped either to enter a hollow spoke or to engage a solid spoke, as may be preferred, in the latter case the spoke fitting into the socketed end of said end piece or tip. The felly is preferably made convexed on its inner periphery, as shown in Fig. 5, and the end piece will be correspondingly constructed to fit against the convexed surface of the felly. It will be obvious that if the flanged head $D^2$ be dispensed with the end of the spoke would be concaved to fit against the convexed surface of the felly. The band B, if employed, is first applied to the hub, after which the bands E are pressed on, preferably in a heated condition, upon the two extremities of the hub. It will be understood that the hollow spokes are driven firmly home upon the dummy spokes C. The felly being made in accordance with my patent above referred to will of course have the blocks G put into place before the edges of the tire are crimped down thereover ready for the tire.

In Fig. 1 I show the band B with two metal bands E engaged upon the hub, one on each side of the band B. I would have it understood, however, that I do not limit myself solely to the use of the said band B, as the lugs or dummy spokes might be differently engaged with the hub and with the spokes. Thus in Fig. 6, instead of employing a band B, provided with dummy spokes C, the hollow metal spoke is provided with lugs or lower end pieces (indicated at C') entering the hub A and the lower ends of the hollow spokes D, said lugs C' being preferably formed of malleable iron. The said lugs C' may be formed with a shoulder, as shown at c, Fig. 6, to rest upon the outer face of the hub, one end of said lug firmly entering the hub, as ordinary wooden spokes commonly do, and the opposite end thereof firmly entering the adjacent end of the hollow spoke D. In Fig. 8 instead of having the malleable lug or lower end piece C' formed to enter a hollow metal spoke said end piece or lug is formed with a socket (indicated at $C^2$) to receive the lower end of an ordinary wooden spoke, said end piece also shouldered, as indicated at c, to rest upon the outer surface of the hub. In either case the lug or lower end piece engaged with the lower end of the spoke being formed with a solid shoulder $C^3$, entering the wooden body of the hub.

It is well known that the weak point with the present wooden spokes is at the small terminals entering the hub and felly, which terminals are liable to rot and break; but by employing the metal tips or end pieces this liability of breakage is very materially overcome, as the malleable end pieces strengthen the spokes in a most effectual manner.

The bands E are constructed with outwardly-projecting flanges e, setting up snugly against the outer surface of the lower end of the spokes. In Fig. 7 I show a wooden hub A, whereon instead of a separate band B intervening between the bands E a single band E, with a connecting-band B', provided with lugs $C^2$, are all formed in a single integral piece of malleable casting; but I would have it understood that my invention contemplates such construction as coming within the scope of my invention.

A hollow metal spoke provided with a lug or end piece C', as shown in Fig. 6, may be employed in connection with any suitable hub and take the place of the ordinary wooden spokes now in use. So, also, a wooden spoke provided with an end piece C', engaged therewith, may likewise be employed in connection with any desired hub.

Obviously a wheel so constructed is simple and light, yet strong, durable, and efficient.

What I claim as my invention is—

1. In a vehicle-wheel, a hub provided with outwardly-projecting lugs or dummy spokes upon its periphery intermediate the ends of the hub, and spokes arranged with their inner ends engaging said lugs or dummy spokes, said hub provided with outwardly-projecting metal flanges engaging the inner ends of said spokes, substantially as set forth.

2. In a vehicle-wheel, the combination with a hub, of a metallic band encircling the hub intermediate its ends provided with outwardly-projecting lugs, spokes engaged at their inner ends with said lugs, and flanges upon the hub engaging the inner ends of said spokes, substantially as set forth.

3. In a vehicle-wheel, the combination with a hub, of a band provided with outwardly-projecting lugs encircling the hub intermediate its ends, hollow metal spokes engaged at their inner ends with said lugs, and a band engaged upon the hub and about the adjacent ends of said spokes to hold the spokes in place, substantially as set forth.

4. In a vehicle-wheel, a hub, a hollow metal felly, wooden blocks located in said felly, and spokes each provided with a metal plug or end piece at its inner and at its outer end, the end piece at the inner end of the spoke engaged with the hub and abutting against its outer periphery, the end piece at the outer end of the spoke entering the corresponding block and abutting against the inner periphery of the felly, substantially as set forth.

5. In a vehicle-wheel, a hollow metal felly, wooden blocks located within the felly, and spokes each provided with a metal end piece at its outer extremity entering the corresponding block in said felly, said end pieces abutting against the inner periphery of the felly, substantially as set forth.

In testimony whereof I sign this specification in the presence of two witnesses.

WILLIAM B. ROBERTS.

Witnesses:
JOHN F. DEVINE,
LEWIS HUTZLEN.